3,271,259
SYNTHETIC LAVANDIN OIL
Harry C. Saunders, Nutley, N.J., assignor to Universal Oil Products Company, Des Plaines, Ill., a corporation of Delaware
No Drawing. Filed Oct. 22, 1965, Ser. No. 502,397
4 Claims. (Cl. 167—94)

This invention relates to perfume compositions and more particularly relates to a synthetic lavandin oil comprising an admixture of 3a,4,5,6,7,7a-hexahydro-4,7-methanoindene having an oxo substituent in one of the 5 and 6 positions and 5-acetoxy-5-vinyl-2,3,3a,4,5,6,7,7a-octahydro-4,7-methanoindene and to perfumes containing such admixture as a replacement for the naturally occurring lavandin oil constituent thereof.

Lavandin oil is a natural essential oil derived from the *Lavandula hybrida*, a hybrid plant, cultivated primarily on a commercial scale in the South of France. This natural oil, consisting of an admixture of a very large number of substances such as linalool, linalyl acetate, cineole, camphene, ethyl-n-amyl ketone, has a strongly woody-herbaceous odor with a camphene-cineole-like topnote, which renders such oil highly valuable for perfumery use. Lavandin oil, in fact, is one of the world's ten largest perfume raw materials by volume obtained from natural sources. This natural oil, however, like other products derived from plants, suffers from the disadvantage of fluctuating supply and quality due to uncontrollable factors such as crop-growing weather. Obviously, therefore, a synthetic replacement for lavandin oil, which is stable in supply and quality, would be highly desirable in the perfume industry which now vitally depends upon a constant and large supply of natural lavandin oil for the commercial success of a large number of commercial products. Such a synthetic replacement having the desirable perfumery properties of natural lavandin oil has now been discovered and, moreover, this synthetic replacement is derived from non-natural sources which render such replacement both dependable in availability and consistent in quality.

Accordingly, an object of this invention is to provide a synthetic perfumery material utilizable as a replacement for natural lavandin oil. Another object is to provide a synthetic lavandin oil comprising an admixture of certain substituted 4,7-methanoindenes which possesses the desirable odor properties of natural lavandin oil and which, moreover, is derived from non-natural sources. A still further object of this invention is to provide perfumes having as the natural lavandin oil constituent thereof a synthetic replacement comprising an admixture of certain substituted 4,7-methanoindenes.

The substituted 4,7-methanoindenes which may be admixed according to this invention to create a synthetic replacement for natural lavandin oil have the following structural formulae where structure I represents 5- acetoxy-5-vinyl-2,3,3a,4,5,6,7,7a-octahydro-4,7 - methanoindene which for convenience is hereinafter referred to as octahydromethanoindene and where structure II represents 3a,4,5,6,7,7a-hexahydro-4,7-methanoindene having an oxo substituent in one of the 5 and 6 positions which for convenience is hereinafter referred to as hexahydromethanoindene:

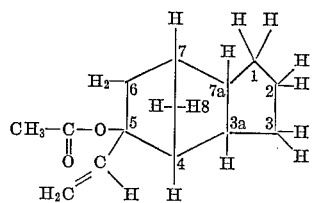
(I)

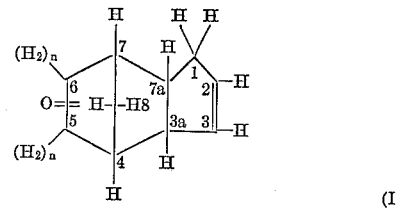
(II)

wherein for FIGURE II, $n$ is an integer of 0 and 1 provided that for the carbon atom in the 5 or 6 position which is substituted with the oxo group, the integer associated therewith is 0 and the other integer is 1. Because of the existence of the double bond in the hexahydromethanoindene, illustrated as FIGURE II above, the positions 5 and 6 are not chemically equivalent, and accordingly when the hexahydromethanoindene is substituted with the oxo group, different isomeric compositions result depending upon whether the oxo substituent is on the 5 or 6 positioned carbon atom. The extremely close physical similarity of such isomers, moreover, prevents ready identification and separation of the different isomers from each other. For this reason, it is intended that both isomeric compositions of the hexahydromethanoindene as well as any mixtures thereof be described in this specification and appended claims as 3a,4,5,6,7,7a-hexahydro-4,7-methanoindene substituted in one of the 5 and 6 positions with an oxo group.

As hereinbefore indicated the synthetic lavandin oil composition of this invention comprising an admixture of the octahydromethanoindene and the hexahydromethanoindene has the particularly desirable feature of being obtained from readily available non-natural sources which avoids fluctuations in supply and quality, a characteristic of a naturally obtained substance such as lavandin oil. Both the octahydromethanoidene and the hexahydromethanoindene are obtained from such readily available, non-natural materials as cyclopentadiene or more particularly the dimer of cyclopentadiene. The hexahydromethanoindene component of the synthetic lavandin oil of this invention, that is 3a,4,5,6,7,7a-hexahydro-4,7-methanoindene substituted in one of the 5 and 6 positions with an oxo group, may be prepared by reacting cyclopentadiene dimer, 3a,4,7,7a-tetrahydro-4,7-methanoindene, with aqueous sulfuric acid to obtain 3a, 4,5,6,7,7a-hexahydro-4,7-methanoindenol substituted in one of the 5 and 6 positions with the hydroxy group. The methanoindenol is then converted to the desired 3a,4,5,6,7,7a-hexahydro-4,7-methanoindene substituted in one of the 5 and 6 positions with an oxo group either by oxidation such as with potassium dichromate in the presence of sulfuric acid or by dehydrogenation with a suitable catalyst such as copper chromite.

The octahydromethanoindene component of the synthetic lavandin oil of this invention, that is 5-vinyl-5-acetoxy-2,3,3a,4,5,6,7,7a - octahydro-4,7 - methanoindene, may be prepared by first hydrogenating the 3a,4,5,6,7,7a-hexahydro-4,7-methanoindenol substituted in one of the 5 and 6 positions with the hydroxy group, as prepared for the hexahydromethanoindene, to obtain 5-hydroxy-2,3,3a,4,5,6,7,7a-octahydro-4,7-methanoindene. This hydroxy compound is then converted to 5-oxo-2,3,3a,4,5,6,7,7a-octahydro-4,7-methanoindene either by oxidation such as with potassium dichromate in the presence of sulfuric acid or by dehydrogenation with a suitable catalyst such as copper chromite. The 5-oxo-2,3,3a,4,5,6,7,7a-octahydro-4,7-methanoindene is then reacted with a vinyl magnesium halide to form a vinyl substituted product. The resulting product, an alcohol, is acetylated to form the desired 5-vinyl-5-acetoxy-2,3,3a,4,5,6,7,7a-octahydro-4,7-methanoindene.

The synthetic lavandin oil of this invention possessing the desirable odor properties of natural lavandin oil, and in particular its fresh, refreshing notes, is prepared as hereinbefore indicated by admixing the octahydromethanoindene and the hexahydromethanoindene. The ratio of the octahydromethanoindene to the hexahydromethanoindene in the admixture may be widely varied depending upon the particular odor properties desired. Generally, however, to create a synthetic lavandin oil having odor properties closely resembling those of natural lavandin oil, the ratio of the octahydromethanoindene to the hexahydromethanoindene may range from about 1 to 30 parts by weight of the octahydromethanoindene per one weight part of the hexamethanoindene and more preferably from about 1 to 20 parts by weight per one weight part of the hexahydromethanoindene. The synthetic lavandin oil of this invention, may like the natural lavandin oil be combined with other natural or synthetic materials such as blenders or fixatives to render the material more suitable for perfumery use. For example, the synthetic lavandin oil may be combined with blenders such as amyl salicylate or citronella oils or fixatives such as nitro musks or coumarins to improve its perfumery properties.

The synthetic lavandin oil composition of this invention may be used to replace the natural lavandin oil constituent of perfumes and thus create new perfume compositions. As used herein, the term perfume means a mixture of organic compounds including, for example alcohols, aldehydes, ketones, esters and frequently also hydrocarbons which are combined in fixed proportions so that the odors of the individual compounds combine to produce a harmonious fragrance. The quantity of the synthetic lavandin oil composition of this invention comprising an admixture of the octahydromethanoindene and the hexahydromethanoindene which may be used in perfumes as a replacement for the natural lavandin oil constituent thereof may vary within a wide range and depends upon the particular ratio of the octahydromethanoindene to the hexahydromethanoindene in the synthetic lavandin oil and the particular type of perfume being created. Generally, however, the amount of synthetic lavandin oil in perfumes may range from about 0.1 to 80 percent of the total weight of the perfume with a quantity of about 20 to 50 percent by weight being preferred.

The perfumes of this invention having as a principal constituent the synthetic lavandin oil composition of this invention may be used per se or incorporated into items such as cosmetic creams, soaps, synthetic detergents, talcum powders or other toilet goods such as shampoos to produce products having desirable commercial fragrance properties and in particular fresh, refreshing odors.

The following examples are cited to illustrate the synthetic lavandin oil composition of this invention and the novel perfume compositions created through use of such synthetic lavandin oil composition as a replacement for the natural oil lavandin constituent of perfumes:

*Example I*

A synthetic lavandin oil was prepared by admixing four weight parts of 5-acetoxy-5-vinyl-2,3,3a,4,5,6,7,7a-octahydro-4,7-methanoindene and one weight part of 3a,4,5,6,7,7a-hexahydro-4,7-methanoindene substituted in one of the 5 and 6 positions with an oxo group. This admixture was sampled on a perfume blotter and the odor observed was compared with the odor of natural lavandin oil. It was observed that the synthetic lavandin oil had a strongly woody-herbaceous body note with a very fresh, camphene-cineol-like topnote which closely resembled the odor profile of the natural lavandin oil.

*Example II*

A lavender-type cologne was prepared having the following formula using natural lavandin oil:

| Components: | Parts by weight |
|---|---|
| Natural lavandin oil | 19 |
| Oil bergamot | 25 |
| 5,7-diisopropyl-3,4-dihydrocoumarin | 1 |
| 7-acetyl-1,1,3,4,4,6-hexamethyltetralin, 5% alcohol | 1 |
| Linalool | 10 |
| Oil Petitgras | 5 |
| Allyl phenylpropionate | ½ |
| Oil coriander 10% | ½ |
| Oil neroli bigarade | ½ |

A second cologne was prepared using the same formula as above, except that the natural lavandin oil constituent was replaced with 19 parts by weight of synthetic lavandin oil comprising an admixture of 18 weight parts of 5-acetoxy-5-vinyl-2,3,3a,4,5,6,7,7a-octahydro-4,7-methanoindene and 1 weight part of 3a,4,5,6,7,7a-hexahydro-4,7-methanoindene substituted in one of the 5 and 6 positions with an oxo group.

The odor profiles of the two cologne compositions were compared and were found to be substantially similar especially in respect to both having fresh, refreshing notes which characterize perfume compositions containing natural lavandin oil.

I claim as my invention:

1. A synthetic lavandin oil comprising an admixture of 3a,4,5,6,7,7a-hexahydro-4,7-methanoindene substituted in one of the 5 and 6 positions with an oxo group and 5 - vinyl - 5 - acetoxy 2,3,3a,4,5,6,7,7a-octahydro-4,7-methanoindene.

2. The synthetic lavandin oil of claim 1 wherein the 5 - vinyl - 5 - acetoxy - 2,3,3a,4,5,6,7,7a - octahydro - 4,7-methanoindene is present in about 1 to 30 parts by weight per one weight part of the 3a,4,5,6,7,7a-hexahydro-4,7-methanoindene substituted in one of the 5 and 6 positions with an oxo group.

3. A perfume composition having as the natural lavandin oil constituent thereof a synthetic lavandin oil replacement comprising an admixture of 3a,4,5,6,7,7a-hexahydro-4,7-methanoindene substituted in one of the 5 and 6 positions with an oxo group and 5-vinyl-5-acetoxy-2,3,3a,4,5,6,7,7a-octahydro-4,7-methanoindene.

4. The perfume composition according to claim 3 wherein the 5-vinyl-5-acetoxy-2,3,3a,4,5,6,7,7a-octahydro-4,7-methanoindene is present in from about 1 to 30 parts by weight per one weight part of the 3a,4,5,6,7,7a-hexahydro-4,7-methanoindene substituted in one of the 5 and 6 positions with an oxo group.

No references cited.

JULIAN S. LEVITT, *Primary Examiner.*

VERA C. CLARKE, *Assistant Examiner.*